(12) United States Patent (10) Patent No.: US 11,726,946 B2
Lin et al. (45) Date of Patent: Aug. 15, 2023

(54) I2C BUS COMMUNICATION CONTROL METHOD, DEVICE AND SYSTEM, AND READABLE STORAGE MEDIUM

(71) Applicant: INSPUR (BEIJING) ELECTRONIC INFORMATION INDUSTRY CO., LTD., Beijing (CN)

(72) Inventors: Ningya Lin, Beijing (CN); Yuanman Tong, Beijing (CN)

(73) Assignee: INSPUR (BEIJING) ELECTRONIC INFORMATION INDUSTRY CO., LTD., Beijing (CN)

(*) Notice: Subject to any disclaimer, the term of this patent is extended or adjusted under 35 U.S.C. 154(b) by 0 days.

(21) Appl. No.: 17/795,255

(22) PCT Filed: Feb. 19, 2021

(86) PCT No.: PCT/CN2021/076839
§ 371 (c)(1),
(2) Date: Jul. 26, 2022

(87) PCT Pub. No.: WO2021/258748
PCT Pub. Date: Dec. 30, 2021

(65) Prior Publication Data
US 2023/0064411 A1  Mar. 2, 2023

(30) Foreign Application Priority Data

Jun. 24, 2020 (CN) .......................... 202010589296.0

(51) Int. Cl.
*G06F 13/20* (2006.01)
*G06F 13/42* (2006.01)

(52) U.S. Cl.
CPC .. *G06F 13/4282* (2013.01); *G06F 2213/0016* (2013.01)

(58) Field of Classification Search
None
See application file for complete search history.

(56) References Cited

U.S. PATENT DOCUMENTS 7,188,202 B1   3/2007 Dorr et al.
8,024,499 B1 * 9/2011 Aybay ................... H04L 12/403
                                                       710/46
(Continued)

FOREIGN PATENT DOCUMENTS

CN       105279133 A    1/2016
CN       106936647 A    7/2017
(Continued)

OTHER PUBLICATIONS

International Search Report and English Translation cited in PCT/CN2021/076839 dated May 19, 2021, 5 pages.
(Continued)

*Primary Examiner* — Henry Tsai
*Assistant Examiner* — Dean Phan

(57) ABSTRACT

An I2C bus communication control method, device and system, and a readable storage medium. The method comprises: receiving configuration information of an I2C bus sent by an upper-layer application; analyzing the configuration information to obtain a plurality of polling parameters; writing the plurality of polling parameters into a polling table; and controlling the I2C bus, and executing a corresponding read-write operation according to the polling table. In the method, the read-write operation executed on the I2C bus is performed according to the polling table, thus an accurate communication condition of the I2C bus can be directly obtained on the basis of the polling table without accessing a bus state in a polling manner; congestion risks (Continued)

can be reduced, and the access efficiency of a single main device can also be achieved when a plurality of main devices exist.

17 Claims, 2 Drawing Sheets

(56) References Cited

U.S. PATENT DOCUMENTS

| | | | |
|---|---|---|---|
| 10,019,546 B1* | 7/2018 | Staler | G06F 30/39 |
| 10,348,834 B2* | 7/2019 | VanWart | H04L 43/08 |
| 10,860,509 B1* | 12/2020 | Watkins | G06F 13/28 |
| 2003/0079061 A1 | 4/2003 | Azzarito et al. | |
| 2010/0257137 A1* | 10/2010 | Escribano Bullon | G06F 16/275 707/E17.046 |
| 2010/0318693 A1 | 12/2010 | Espig et al. | |
| 2017/0330449 A1* | 11/2017 | Lunardhi | H04L 67/125 |
| 2019/0188125 A1* | 6/2019 | Lin | G06F 3/0652 |

FOREIGN PATENT DOCUMENTS

| | | |
|---|---|---|
| CN | 107066413 A | 8/2017 |
| CN | 111090600 A | 5/2020 |
| CN | 111737173 A | 10/2020 |

OTHER PUBLICATIONS

Written Opinion and English Translation cited in PCT/CN2021/076839 dated May 19, 2021, 8 pages.

First Office Action cited in CN202010589296.0, dated Aug. 6, 2021, 10 pages.

* cited by examiner

I2C BUS COMMUNICATION CONTROL METHOD, DEVICE AND SYSTEM, AND READABLE STORAGE MEDIUM

The present application claims priority to Patent Application No. 202010589296.0, filed on Jun. 24, 2020 in China National Intellectual Property Administration, and entitled "I2C Bus Communication Control Method, Device and System, and Readable Storage Medium", the contents of which are hereby incorporated by reference in its entirety.

TECHNICAL FIELD

The present application relates to the technical field of communication, in particular to an inter-integrated circuit (I2C) bus communication control method, device and system, and a readable storage medium.

BACKGROUND ART

An I2C bus is a two-line type serial bus used for connecting a microcontroller with peripheral equipment thereof. The I2C bus is a bus standard widely adopted in the fields of microelectronics and communication control.

The I2C transmits information between devices connected to the bus through a serial data (SDA) line and a serial clock (SCL) line. Each device has a unique address identifier, and can serve as a transmitter or a receiver (decided by functions of the devices). A host is a device (namely, main device) for initializing data transmission of the bus and generating clock signals for which transmission is allowed. Correspondingly, any addressed device (slave device) is considered as a slave.

In existing I2C controller access solutions, a polling mode is adopted when accessing an I2C controller to acquire a bus state, so as to solve the problem that an existing I2C access standard process is not high in efficiency. However, in such solutions, a polling program needs to be specially designed by a developer for the polling mode, whenever hardware changes, the polling program must change accordingly, and when the bus is busy and congested, an upper layer may frequently acquire bus state information by occupying system resources, leading to extremely low management efficiency. That is, the problem of low I2C access efficiency still has not been well solved.

In conclusion, the problems of how to effectively improve the I2C access efficiency, etc. are technical problems urgently required to be solved by those skilled in the art at present.

SUMMARY

The present application aims at providing an I2C bus communication control method, device and system, and a readable storage medium. An upper-layer application and underlying hardware can accurately obtain the communication condition of a bus based on a polling table, and the situation that the communication of the bus is frequently acquired can be avoided; and the communication of an I2C bus is controlled according to the polling table, congestion risks can be avoided, and the access efficiency of an application scene where a plurality of main devices exist can be improved.

In order to solve the above technical problem, the present application provides the following technical solution:

An I2C bus communication control method, including:
receiving configuration information of an I2C bus sent by an upper-layer application;
analyzing the configuration information to obtain a plurality of polling parameters;
writing the plurality of polling parameters into a polling table; and
controlling the I2C bus, and executing a corresponding read/write operation according to the polling table.

Preferably, the method further includes:
receiving configuration modification information sent by the upper-layer application; and
updating the polling table through the configuration modification information.

Preferably, the step of analyzing the configuration information to obtain the plurality of polling parameters, includes:
analyzing the configuration information to obtain an operation type, a main device, a slave device, a number of bytes, polling time and a priority corresponding to each read-write operation respectively;
calculating remaining time corresponding to the read-write operation through the number of bytes and a polling period corresponding to each read-write operation; and
taking the operation type, the main device, the slave device, the number of bytes, the polling time, the remaining time and the priority corresponding to one read-write operation as one string of polling parameter.

Preferably, the step of calculating the remaining time corresponding to the read-write operation through the number of bytes and the polling period corresponding to each read-write operation, includes:
calculating executing time for executing one read-write operation through the number of bytes and a bus frequency; and
obtaining the remaining time through an underlying clock and in combination with the executing time and the polling period.

Preferably, the step of controlling the I2C bus, and executing the corresponding read-write operation according to the polling table, includes:
determining each read-write operation to be executed according to the corresponding operation type, main device, slave device and number of bytes;
determining the executing time of each read-write operation to be executed according to the priority and the remaining time;
executing each read-write operation to be executed according to the executing time; and
checking the read-write operations of the I2C bus, and intercepting failed read-write operations.

Preferably, the method further includes:
receiving a communication interruption request sent by the upper-layer application; and
generating an end signal of a target read-write operation, wherein the target read-write operation is a read-write operation currently executed by the I2C bus.

Preferably, the method further includes:
in response to the access failure frequency of a target slave device reaching a degradation threshold value, reducing the priority, corresponding to the target slave device, in the polling table.

An I2C bus communication control device, including:
a configuration information acquisition module, configured to receive configuration information of an I2C bus sent by an upper-layer application;
an analysis module, configured to analyze the configuration information to obtain each polling parameter;

a polling table maintenance module, configured to write the polling parameters into a polling table; and a read-write operation executing module, configured to control the I2C bus, and execute a corresponding read-write operation according to the polling table.

An I2C bus communication control system, including:

an upper-layer application, an I2C bus communication control equipment, an I2C main devices and an I2C slave devices which are connected with an I2C bus;

wherein the upper-layer application accesses the I2C bus communication control equipment through an Advanced eXtensible Interface (AXI) bus;

the I2C bus communication control equipment includes a register, a counter and a polling table; and the I2C bus communication control equipment, is configured to execute any steps of the above I2C bus communication control method.

I2C bus communication control equipment, including:

a storage, configured to store a computer program; and a processor, configured to implement any steps of the above I2C bus communication control method when executing the computer program.

A readable storage medium storing a computer program, and the computer program implementing any steps of the above I2C bus communication control method when executed by a processor.

The method provided by embodiments of the present application is applied. The configuration information of the I2C bus sent by the upper-layer application is received; the configuration information is analyzed to obtain the plurality of polling parameters; the plurality of polling parameters are written into the polling table; and the I2C bus is controlled, and the corresponding read-write operation is executed according to the polling table.

In the method, the configuration information sent by the upper-layer application is written into the polling table, and then the plurality of polling parameters are obtained. Then, the I2C bus is controlled to execute the read-write operation corresponding to the polling read operation parameters. It can be seen that in the method, as the read-write operations executed on the I2C bus are executed according to the polling table, an accurate communication condition of the I2C bus can be directly obtained on the basis of the polling table without accessing a bus state in a polling manner. As the read-write operations executed on the I2C bus are executed according to the polling table, congestion risks can be greatly reduced, and the access efficiency of a single main device can also be achieved when a plurality of main devices exist. The method facilitates management and maintenance; and if hardware or function change occurs, only the polling table needs to be updated, a program does not need to be modified, and function update or hardware replacement can be quickly adapted.

Correspondingly, embodiments of the present application further provide the I2C bus communication control device and system corresponding to the above I2C bus communication control method, and the readable storage medium, which have the above technical effects not repeated here.

BRIEF DESCRIPTION OF THE DRAWINGS

In order to describe embodiments of the present application or technical solutions in the prior art, drawings required in the embodiments or the prior art will be briefly described below. Obviously, the drawings in the illustration are only some embodiments of the present application. Those ordinarily skilled in the art can also acquire other drawings according to the provided drawings without creative labor.

DETAILED DESCRIPTION

In order to enable those skilled in the art to better understand the solution of the present application, the present application will be further described in detail below with reference to the accompanying drawings and specific embodiments. Apparently, the described embodiments are only a part of the embodiments the present application, rather than all the embodiments. Based on the embodiments of the present application, all other embodiments obtained by those skilled in the art without creative work shall fall within the protection scope of the present application.

Figure 1:
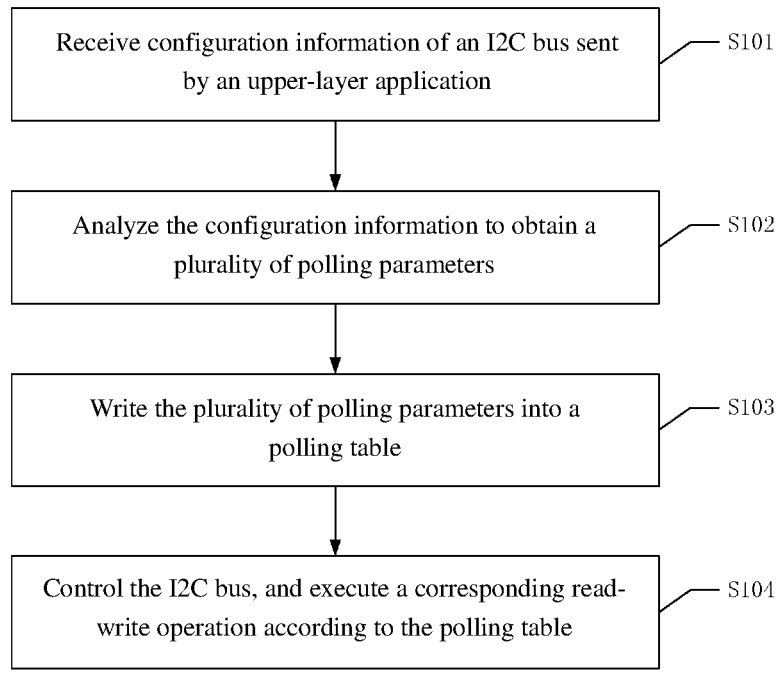
FIG. 1 is an implementation flow diagram of an I2C bus communication control method in embodiments of the present application.

Referring to FIG. 1, FIG. 1 is an implementation flow diagram of an I2C bus communication control method in an embodiment of the present application. The method includes the following steps:

S101. Receiving configuration information of an I2C bus sent by an upper-layer application.

Wherein the upper-layer application (APPLY), for example, may be an application running on a mobile phone or a tablet computer, and the upper-layer application may be specifically applied by individual users, or enterprises. The upper-layer application is not specifically limited in the embodiment.

In the embodiment, the upper-layer application can send the configuration information corresponding to the I2C bus in a writing manner, so as to perform data transmission on the basis of the I2C bus.

Wherein the configuration information may specifically point out when and how one particular main device accesses one particular slave device, which access manner is adopted, and what is the number of access bytes. Specifically, the configuration information may include main devices, operation types, slave devices, the number of bytes, polling periods and priorities.

Wherein the operation types may include read operations and write operations, and the number of bytes is digits of reading or digits of writing; the polling periods are access interval periods, and correspond to the polling time; and the priorities are used for determining that access requirements of which main devices are preferably addressed when access conflicts occur.

S102. Performing analysis on the configuration information to obtain a plurality of polling parameters.

The configuration information can be analyzed after being obtained to obtain the plurality of polling parameters.

Wherein one string of polling parameter specifically corresponds to one read-write operation, and the polling parameters may specifically include: operation types, main devices, slave devices, number of bytes, polling time, remaining time and priorities.

The process of obtaining the polling parameters, includes:

step 1. analyzing the configuration information to obtain an operation type, a main device, a slave device, a number of bytes, a polling period and a priority corresponding to each read-write operation respectively;

step 2. calculating remaining time corresponding to the read-write operation through the number of bytes and the polling time corresponding to each read-write operation; and step 3. taking the operation type, the main device, the slave device, the number of bytes, the polling time, the remaining time and the priority corresponding to one read-write operation as one string of polling parameter.

Wherein the step 2 may specifically include:

step 2.1. calculating executing time for executing one read-write operation through the number of bytes and a bus frequency; and step 2.2. obtaining the remaining time through an underlying clock and in combination with the executing time and the polling period.

Specifically, each serial number in a polling table represents one I2C read-write operation, and can be shown as an 8-bit binary number, (the 8-bit binary number can represent 256 operations in total, wherein the number of the operations is much larger than that of conventional operations of one I2C bus), and main devices are distinguished in the serial numbers through values of designated bits.

Specifically, if there are two main devices, the main devices can be distinguished with the use of one bit (e.g., the highest bit), for example, 0 identifies the main device 1, and 1 identifies the main device 2; if there are three or four main devices, the main devices are distinguished with the use of two bits; if there are five to eight main devices, the main devices are distinguished with the use of three bits; and the rest can be done in the same manner. Each I2C operation is decided by the address of a SLAVE device (slave device) and the offset address of a slave internal register.

The number of bytes shows the number of bytes required to be occupied by a read operation or a write operation, and there is no need to distinguish between the read operation and the write operation at the number of bytes of the polling table.

The executing time of the read/write operation can be calculated through the number of bytes and the default bus frequency in a system. The polling time shows an interval of periodically acquiring information, the remaining time shows time remaining to a next read/write operation, and the time can be determined from the underlying clock, that is, a countdown operation is synchronously performed after the upper-layer application acquires data once.

Preferably, more accurate timing time can be obtained by increasing an access frequency.

The priority defines which operation is preferably performed when conflicts are about to occur, and remaining time of another operation will be deferred.

S103. Writing the plurality of polling parameters into the polling table.

Writing the polling parameters into the polling table after being obtained.

Specifically, in the embodiment, a type list with headers comprising serial number, operation type, slave device, number of bytes, polling time, remaining time and priority can be set; and correspondingly, the configuration information includes operation types, slave devices, number of bytes, polling periods and priorities.

Figure 2:
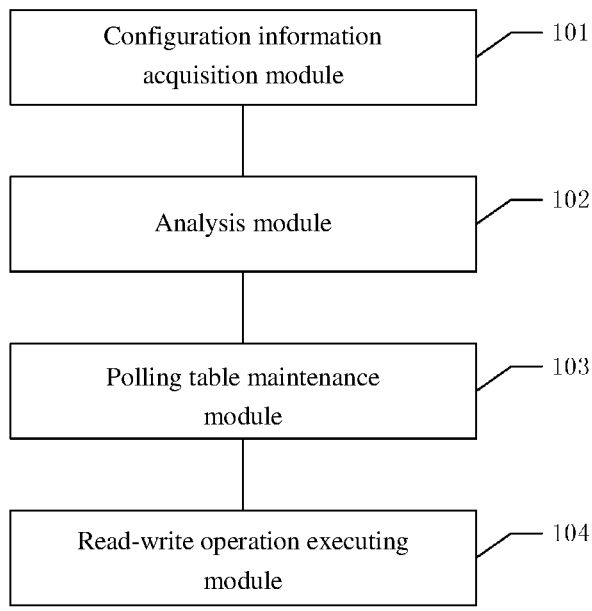
FIG. 2 is a structural schematic diagram of an I2C bus communication control device in embodiment of the present application.

For example, refer to FIG. 2, FIG. 2 is a main structural schematic diagram of an I2C bus communication control system in an embodiment of the present application. Assuming that there are two main devices and two slave devices A and B on the I2C bus, addresses of the slave devices A and B are 0X33 and 0X34. If the configuration information includes:

the main device 1 and the device A offset 0x01 have a 0x88 write operation, the polling period is two seconds;

the main device 1 has a 2 byte read operation for the device B offset 0x2, the polling period is three seconds;

the main device 2 and the device A offset 0x01 have a 0x88 write operation, the polling period is two seconds;

the main device 2 has a 3 byte read operation for the device B offset 0x3, the polling period is three seconds.

Correspondingly, four polling parameters can be obtained by analyzing the configuration information, the polling parameters are written into the polling table, and the polling table as shown below is obtained:

| Serial number | Slave | Offset | Number of bytes | Polling time | Remaining time (10 us) | Priority |
|---|---|---|---|---|---|---|
| 00000001 | 00110011 | 00000001 | 00000001 | 0111110100 | 00001110101001100000 | 01 |
| 00000010 | 00110100 | 00000010 | 00000002 | 1011101110 | 00001110101001011101 | 01 |
| 10000011 | 00110011 | 00000001 | 00000001 | 0111110100 | 00011101010011000000 | 01 |
| 10000100 | 00110100 | 00000011 | 00000003 | 1011101110 | 00101011111100100000 | 10 |

Wherein the highest bit of the serial number is used for distinguishing the main devices, and 0 identifies the main device 1; and 1 identifies the main device 2.

The remaining time can be set as read-only data, and the remaining time can be automatically generated after all the operations are analyzed. All the data are analyzed in a conventional mode, and with a maximum polling period number used as a total period number, each task is averagely allocated in each time period within the period, so as to ensure the sparsity among communications.

S104. Controlling the I2C bus, and performing a corresponding read-write operation according to the polling table.

That is, specific read-write operations executed by the I2C bus and specific time are determined according to the polling table in which each record corresponds to specific polling read-write reference parameters of one read-write operation.

The specific executing process, includes:

step 1. determining each read-write operation to be executed according to the corresponding operation type, main device, slave device and number of bytes;

step 2. determining executing time of each read-write operation to be executed according to the priority and the remaining time;

step 3. executing each read-write operation to be executed according to the executing time; and step 4. checking the read-write operations of the I2C bus, and intercepting failed read-write operations.

That is, the specific polling period, the operation-related main device, the slave device, the access type, the access time, etc. of each read-write operation can be determined through the polling table. It is not needed to query a state register whenever the I2C bus is accessed. That is, all the main devices in the system access the slave devices through the I2C bus according to the polling table. Data transmitted by the I2C bus can be analyzed and associated with data in the internal register, so as to update relevant information of the polling table. In order to ensure system security, in actual application, when the I2C bus is controlled to execute the read-write operations, the read-write operations of the I2C bus can be checked, and the failed read-write operations can be intercepted. A checking function can be set, that is, read-write operations not meeting a checking condition will be intercepted, so as to protect system security.

Preferably, when system hardware is replaced, or after an upper layer is used for function update, the following steps can also be executed to complete I2C adaptation:

step 1. receiving configuration modification information sent by the upper-layer application; and step 2. updating the polling table through the configuration modification information.

By updating the polling table, I2C adaptation can be completed without modifying an underlying access control program. Specifically, the configuration modification information may specifically refer to changes in polling time, an access address or an access mode of a certain specific read-write operation and a modification to a certain record in the polling table, and may also refer to replacement in all records in the whole polling table for obtaining new configuration information.

Preferably, in order to shorten emergent communication time delay, a communication interruption request sent by the upper-layer application can be received; and an end signal of a target read-write operation is generated, wherein the target read-write operation is a read-write operation currently executed by the I2C bus. That is, the end signal can be generated to the current I2C bus operation in an emergency of urgent communication, so as to shorten the emergent communication time delay.

Preferably, fault slave devices can also be marked, so as to reduce the access frequency of the fault slave devices. That is, the following step of reducing the priority, corresponding to a target slave device, in the polling table if the access failure frequency of the target slave device reaches a degradation threshold value can also be executed. If a slave device in a certain address fails to be accessed continuously (if the degradation threshold value is 3, that is, access fails for three times successively, it is considered that successive access fails), the slave device is considered to be faulty, the slave device is degraded in the polling table, for example, the priority is reduced to the minimum, so as to further reduce the access frequency of the fault slave device.

The method provided by embodiments of the present application is applied. The configuration information of the I2C bus sent by the upper-layer application is received; the configuration information is analyzed to obtain the plurality of polling parameters; the plurality of polling parameters are written into the polling table; and the I2C bus is controlled, and the corresponding read-write operation is executed according to the polling table.

In the method, the configuration information sent by the upper-layer application is written into the polling table, and then the plurality of polling parameters are obtained. Then, the I2C bus is controlled to execute the read-write operation corresponding to the polling read operation parameters. It can be seen that in the method, as the read-write operations executed on the I2C bus are executed according to the polling table, an accurate communication condition of the I2C bus can be directly obtained on the basis of the polling table without accessing a bus state in a polling manner. As the read-write operations executed on the I2C bus are executed according to the polling table, congestion risks can be greatly reduced, and the access efficiency of a single main device can also be achieved when a plurality of main devices exist. The method facilitates management and maintenance; and if hardware or function change occurs, only the polling table needs to be updated, a program does not need to be modified, and function update or hardware replacement can be quickly adapted.

Corresponding to the above method embodiment, an embodiment of the present application further provides an I2C bus communication control device, and the I2C bus communication control device described below and the I2C bus communication control method described above can refer to each other correspondingly.

Refer to FIG. 2, the device includes:

a configuration information acquisition module 101, configured to receive configuration information of an I2C bus sent by an upper-layer application;

an analysis module 102, configured to analyze the configuration information to obtain each polling parameter;

a polling table maintenance module 103, configured to write the polling parameters into a polling table; and a read-write operation executing module 104, configured to control the I2C bus, and execute a corresponding read-write operation according to the polling table.

The device provided by the embodiment of the present application is applied. The configuration information of the I2C bus sent by the upper-layer application is received; the configuration information is analyzed to obtain the plurality of polling parameters; the plurality of polling parameters are written into the polling table; and the I2C bus is controlled, and the corresponding read-write operation is executed according to the polling table.

In the device, the configuration information sent by the upper-layer application is written into the polling table, and then the plurality of polling parameters are obtained. Then, the I2C bus is controlled to execute the read-write operation corresponding to the polling read operation parameters. It can be seen that in the device, as the read-write operations executed on the I2C bus are executed according to the polling table, an accurate communication condition of the I2C bus can be directly obtained on the basis of the polling table without accessing a bus state in a polling manner. As the read-write operations executed on the I2C bus are executed according to the polling table, congestion risks can be greatly reduced, and the access efficiency of a single main device can also be achieved when a plurality of main devices exist. The method facilitates management and maintenance; and if hardware or function change occurs, only the polling table needs to be updated, while a program does not need to be modified, and function update or hardware replacement can be quickly adapted.

In one specific embodiment of the present application, the device further includes:

a polling table updating module, configured to receive configuration modification information sent by the upper-layer application; and update the polling table through the configuration modification information.

In one specific implementation of the present application, the analysis module 102, is specifically configured to analyze the configuration information to obtain an operation type, a main device, a slave device, a number of bytes, a polling period and a priority corresponding to each read-write operation respectively; calculate remaining time corresponding to the read-write operation through the number of bytes and the polling time corresponding to each read-write operation; and take the operation type, the main device, the slave device, the number of bytes, the polling time, the remaining time and the priority corresponding to one read-write operation as one string of polling parameter.

In one specific embodiment of the present application, the analysis module 102, is specifically configured to calculate executing time for executing one read-write operation through the number of bytes and a bus frequency; and obtain the remaining time through an underlying clock and in combination with the executing time and the polling period.

In one specific embodiment of the present application, the read-write operation executing module 104, is configured to determine each read-write operation to be executed according to the corresponding operation type, main device, slave device and number of bytes; determine executing time of each read-write operation to be executed according to the priority and the remaining time; execute each read-write operation to be executed according to the executing time; and check the read-write operations of the I2C bus, and intercept failed read-write operations.

In one specific embodiment of the present application, the device further includes:

a communication interruption control module, configured to receive a communication interruption request sent by the upper-layer application; and generate an end signal of a target read-write operation, wherein the target read-write operation is a read-write operation currently executed by the I2C bus.

In one specific embodiment of the present application, the device further includes:

a fault processing module, configured to reduce the priority, corresponding to a target slave device, in the polling table if the access failure frequency of the target slave device reaches a degradation threshold value.

Corresponding to the above method embodiment, an embodiment of the present application further provides an I2C bus communication control system, and the I2C bus communication control system described below and the I2C bus communication control method described above can refer to each other correspondingly.

Figure 3:
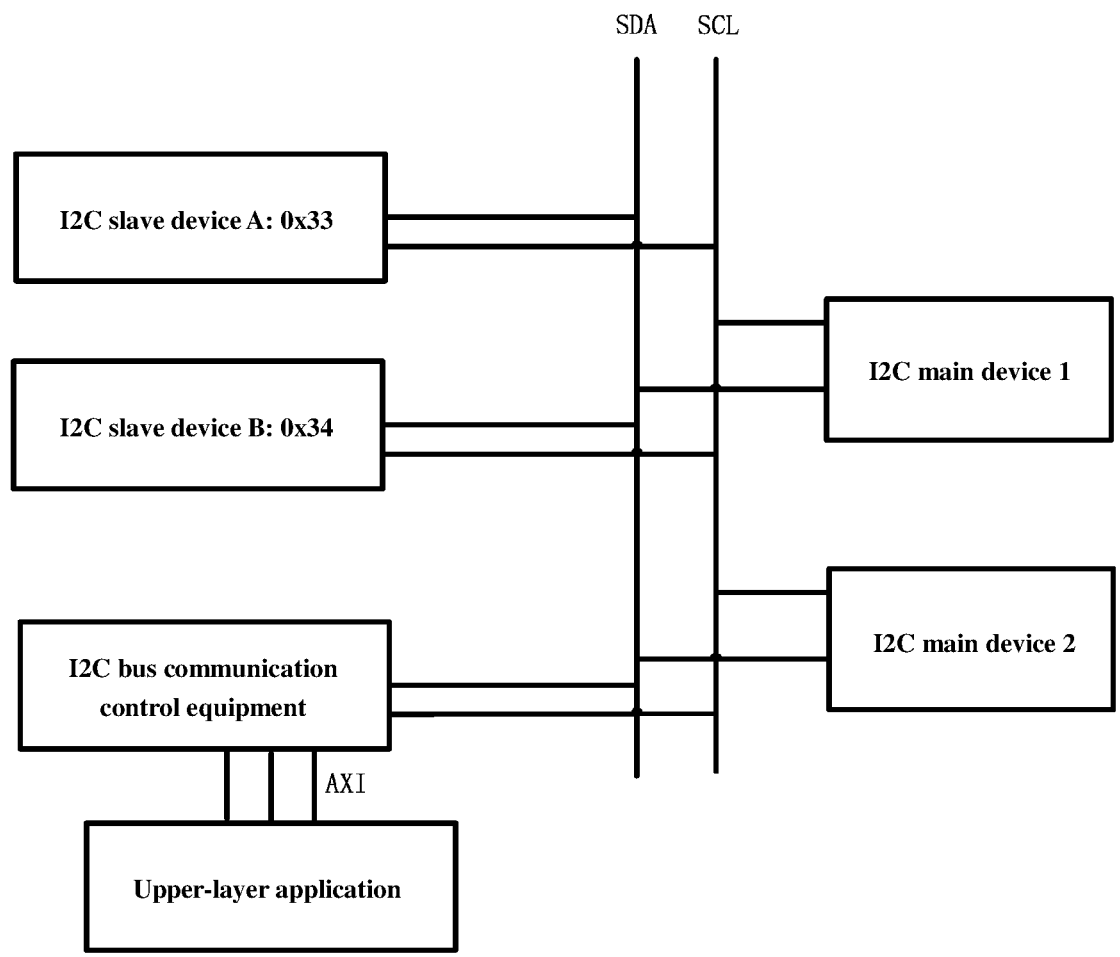
FIG. 3 is a structural schematic diagram of an I2C bus communication control system in embodiments of the present application.

Referring to FIG. 3, the system includes:

an upper-layer application, an I2C bus communication control equipment, an I2C main devices and an I2C slave devices which are connected with an I2C bus;

wherein the upper-layer application accesses the I2C bus communication control equipment through an AXI bus;

the I2C bus communication control equipment includes a register, a counter and a polling table; and the I2C bus communication control equipment is configured to execute the steps of the I2C bus communication control method described in the above method embodiment.

Wherein the specific structure of the I2C bus communication control equipment can be shown by referring to FIG. 3. The I2C bus communication control equipment mainly internally includes four functional modules (the equipment can also be divided into functional modules of other combination types to achieve I2C bus communication control provided by the method embodiment):

1. An agent unit: responsible for generating an end signal to a current I2C bus operation in an emergency of urgent communication, so as to shorten emergent communication time delay. For example, when the temperature of a CPU is too high, a current read-write operation executed by the I2C bus needs to be immediately interrupted, so as to perform a write operation of the I2C bus to emergently control acceleration of a fan.

2. An analysis module: responsible for analyzing data transmitted by the I2C bus, enabling the data to be associated with data in the internal configuration register, and updating relevant information of the polling table. In addition, if a checking function is enabled, read-write operations not meeting a checking condition will be interrupted, so as to protect system security.

3. The polling table: containing polling table information which can be accessed by the I2C bus and the AXI bus.

4. The internal configuration register: may include various detailed configurations, such as a security checking switch, an automatic rereading function and fault device marking. The details are as follows:

The security checking switch: after being switched on, operations that are not of the highest priority and do not conform to slave device addresses and offset addresses will be rejected;

the automatic rereading function: after being enabled, when one read or write operation fails, upper-layer modification is not needed, and next communication is automatically modified into the communication failing this time; and the fault device marking: after being enabled, if a slave device in a certain address fails to be accessed continuously, the device is considered to be faulty, and the priority of the device is reduced to the minimum in the polling table, so as to reduce the access frequency.

5. A timer, responsible for recording a time sequence of the bus, so as to ensure that upper and lower clock frequencies are consistent.

Resources of the whole I2C bus are allocated for utilization again on the basis of the underlying polling table, and there is a better anti-conflict mechanism under the condition that a plurality of main devices exist, so that the utilization rate of the bus is greatly increased, the congestion condition is avoided, and upper-layer resources are saved. Meanwhile, the security and stability of the bus are greatly improved due to the functions of security checking and fault marking.

Corresponding to the above method embodiment, an embodiment of the present application further provides a readable storage medium, and the readable storage medium described below and the I2C bus communication control method described above can refer to each other correspondingly.

A readable storage medium stores a computer program, and the computer program implements the steps of the I2C bus communication control method in the above method embodiment when executed by a processor.

The readable storage medium specifically may be a USB flash disk, a mobile hard disk, a read-only memory (ROM), a random access memory (RAM), a disk, or an optical disk and other various readable storage media capable of storing program codes.

Those skilled in the art can further understand that units and algorithm steps of each example described with reference to the embodiments disclosed herein can be realized through electronic hardware, computer software or combinations of the electronic hardware and the computer software, and in order to clearly describe the interchangeability of the hardware and the software, the composition and steps of each example have been generally described in the above descriptions according to functions. Whether these functions are executed in the form of the hardware or the software depends on particular applications and design constraints of the technical solutions. Those skilled in the art can realize the described functions by using different methods for each particular application, but this realization should not be considered going beyond the scope of the present application.

The invention claimed is:

1. An inter-integrated circuit (I2C) bus communication control method, wherein characterized in that, the method comprises:
receiving configuration information of an I2C bus sent by an upper-layer application;
analyzing the configuration information to obtain a plurality of polling parameters, comprising:
analyzing the configuration information to obtain an operation type, a main device, a slave device, a number of bytes, polling time and a priority corresponding to each read-write operation respectively;
calculating remaining time corresponding to the read-write operation through the number of bytes and a polling period corresponding to each read-write operation; and
taking the operation type, the main device, the slave device, the number of bytes, the polling time, the remaining time and the priority corresponding to one read-write operation as one string of polling parameter;
writing the plurality of polling parameters into a polling table; and
controlling the I2C bus, and executing a corresponding read-write operation according to the polling table.

2. The I2C bus communication control method according to claim 1, wherein the method further comprises:
receiving configuration modification information sent by the upper-layer application; and
updating the polling table through the configuration modification information.

3. The I2C bus communication control method according to claim 1, wherein the step of calculating the remaining time corresponding to the read-write operation through the number of bytes and the polling period corresponding to each read-write operation, comprises:
calculating executing time for executing one read-write operation through the number of bytes and a bus frequency; and
obtaining the remaining time through an underlying clock and in combination with the executing time and the polling period.

4. The I2C bus communication control method according to claim 1, wherein the step of controlling the I2C bus, and executing the corresponding read-write operation according to the polling table, comprises:
determining each read-write operation to be executed according to the corresponding operation type, main device, slave device and number of bytes;
determining an executing time of each read-write operation to be executed according to the priority and the remaining time;
executing each read-write operation to be executed according to the executing time; and
checking the read-write operations of the I2C bus, and intercepting failed read-write operations.

5. The I2C bus communication control method according to claim 1, wherein the method further comprises:
receiving a communication interruption request sent by the upper-layer application; and
generating an end signal of a target read-write operation, wherein the target read-write operation is a read-write operation currently executed by the I2C bus.

6. The I2C bus communication control method according to claim 1, wherein the method further comprises:
in response to an access failure frequency of a target slave device reaching a degradation threshold value, reducing a priority, corresponding to the target slave device, in the polling table.

7. An inter-integrated circuit (I2C) bus communication control system, wherein the system comprises:
an upper-layer application, an I2C bus communication control equipment, I2C main devices and I2C slave devices which are connected with an I2C bus;
wherein the upper-layer application accesses the I2C bus communication control equipment through an Advanced eXtensible Interface (AXI) bus;
the I2C bus communication control equipment comprises a register, a counter and a polling table; and
the I2C bus communication control equipment is configured to execute any steps of:
receive configuration information of the I2C bus sent by the upper-layer application;
analyze the configuration information to obtain a plurality of polling parameters, wherein the I2C bus communication control equipment is further configured to:
analyze the configuration information to obtain an operation type, a main device, a slave device, a number of bytes, polling time and a priority corresponding to each read-write operation respectively;
calculate remaining time corresponding to the read-write operation through the number of bytes and a polling period corresponding to each read-write operation; and
take the operation type, the main device, the slave device, the number of bytes, the polling time, the remaining time and the priority corresponding to one read-write operation as one string of polling parameter;
write the plurality of polling parameters into the polling table; and
control the I2C bus, and execute a corresponding read-write operation according to the polling table.

8. The I2C bus communication control system according to claim 7, wherein the I2C bus communication control equipment is configured to:
receive configuration modification information sent by the upper-layer application; and
update the polling table through the configuration modification information.

9. The I2C bus communication control system according to claim 7, wherein the I2C bus communication control equipment is configured to execute any steps of:
calculate executing time for executing one read-write operation through the number of bytes and a bus frequency; and
obtain the remaining time through an underlying clock and in combination with the executing time and the polling period.

10. The I2C bus communication control system according to claim 7, wherein the I2C bus communication control equipment is configured to:
determine each read-write operation to be executed according to the corresponding operation type, main device, slave device and number of bytes;
determine an executing time of each read-write operation to be executed according to the priority and the remaining time;

execute each read-write operation to be executed according to the executing time; and check the read-write operations of the I2C bus, and intercept failed read-write operations.

11. The I2C bus communication control system according to claim 7, wherein the I2C bus communication control equipment is configured to:
receive a communication interruption request sent by the upper-layer application; and
generate an end signal of a target read-write operation, wherein the target read-write operation is a read-write operation currently executed by the I2C bus.

12. The I2C bus communication control system according to claim 7, wherein the I2C bus communication control equipment is configured to:
in response to an access failure frequency of a target slave device reaching a degradation threshold value, reduce a priority, corresponding to the target slave device, in the polling table.

13. A non-transitory readable storage medium, storing a computer program, wherein the computer program, upon execution by a processor, is configured to cause the processor to:
receive configuration information of an I2C bus sent by an upper-layer application;
analyze the configuration information to obtain a plurality of polling parameters, wherein the computer program, upon execution by the processor, is further configured to cause the processor to:
analyze the configuration information to obtain an operation type, a main device, a slave device, a number of bytes, polling time and a priority corresponding to each read-write operation respectively:
calculate remaining time corresponding to the read-write operation through the number of bytes and a polling period corresponding to each read-write operation; and
take the operation type, the main device, the slave device, the number of bytes, the polling time, the remaining time and the priority corresponding to one read-write operation as one string of polling parameter;
write the plurality of polling parameters into a polling table; and
control the I2C bus, and execute a corresponding read-write operation according to the polling table.

14. The non-transitory readable storage medium according to claim 13, wherein the computer program, upon execution by the processor, is configured to cause the processor to:
receive configuration modification information sent by the upper-layer application; and
update the polling table through the configuration modification information.

15. The non-transitory readable storage medium according to claim 13, wherein the computer program, upon execution by the processor, is configured to cause the processor to:
calculate executing time for executing one read-write operation through the number of bytes and a bus frequency; and
obtain the remaining time through an underlying clock and in combination with the executing time and the polling period.

16. The non-transitory readable storage medium according to claim 13, wherein the computer program, upon execution by the processor, is configured to cause the processor to:
determine each read-write operation to be executed according to the corresponding operation type, main device, slave device and number of bytes;
determine an executing time of each read-write operation to be executed according to the priority and the remaining time;
execute each read-write operation to be executed according to the executing time; and
check the read-write operations of the I2C bus, and intercept failed read-write operations.

17. The non-transitory readable storage medium according to claim 13, wherein the computer program, upon execution by the processor, is configured to cause the processor to:
receive a communication interruption request sent by the upper-layer application; and
generate an end signal of a target read-write operation, wherein the target read-write operation is a read-write operation currently executed by the I2C bus.

* * * * *